United States Patent [19]
Pease

[11] Patent Number: 6,001,155
[45] Date of Patent: Dec. 14, 1999

[54] POLYPHASIC PRESSURIZED HOMOGENIZER

[76] Inventor: John R. Pease, 4432 W. 5820 South, Kearns, Utah 84118

[21] Appl. No.: 08/819,604

[22] Filed: Mar. 17, 1997

[51] Int. Cl.$^6$ ................................................ B01D 47/00
[52] U.S. Cl. .............................. 96/236; 96/351; 96/355; 96/370; 261/29; 261/30; 261/118
[58] Field of Search ............................. 55/228, 229, 244, 55/249, 255, 257.1, 468, 472; 95/151, 149, 177, 195, 197, 200, 201; 96/181, 236, 239, 351, 355, 370, FOR 119, FOR 134, FOR 145, FOR 147, FOR 156; 261/36.1, 29, 30, 78.2, 118, 121.1

[56] References Cited

U.S. PATENT DOCUMENTS

| | | | |
|---|---|---|---|
| 809,383 | 1/1906 | Lowe | 55/244 |
| 1,799,684 | 4/1931 | Gilbert et al. | 55/468 |
| 1,874,990 | 8/1932 | Hawley | 55/468 |
| 2,127,571 | 8/1938 | Pardee, Jr. | 55/468 |
| 2,489,893 | 11/1949 | Johnson | 55/468 |
| 2,658,735 | 11/1953 | Ybarrondo | 55/228 |
| 2,935,375 | 5/1960 | Boucher | 55/229 |
| 3,367,402 | 2/1968 | Cross, Jr. et al. | 55/228 |
| 3,369,344 | 2/1968 | Jackson et al. | 95/201 |
| 3,562,349 | 2/1971 | Pawloski et al. | 261/36.1 |
| 3,667,193 | 6/1972 | McKenzie | 55/228 |
| 3,881,898 | 5/1975 | Darby et al. | 55/257.1 |
| 3,884,653 | 5/1975 | Capulli et al. | 55/229 |
| 4,023,938 | 5/1977 | Guth et al. | 95/201 |
| 4,124,660 | 11/1978 | Sterlini | 55/257.1 |

FOREIGN PATENT DOCUMENTS 794060 4/1958 United Kingdom ..................... 95/197

*Primary Examiner*—C. Scott Bushey
*Attorney, Agent, or Firm*—Bielen, Peterson & Lampe

[57] ABSTRACT

A polyphasic pressurized homogenizer for removing substances, particularly contaminants from a gas environment, the homogenizer having a pressurized gas stream drawing gas from the gas environment and a pressurized liquid stream from a liquid source with the homogenizer having a mixing chamber for mixing the gas stream and liquid stream and a contact conduit with a venturi passage connected to the mixing chamber for homogenizing the gas and liquid mixture with the contact conduit discharging the homogenized mixture into a receiver where the substance originally in the gas is entrained in the liquid and separated from the gas.

13 Claims, 2 Drawing Sheets

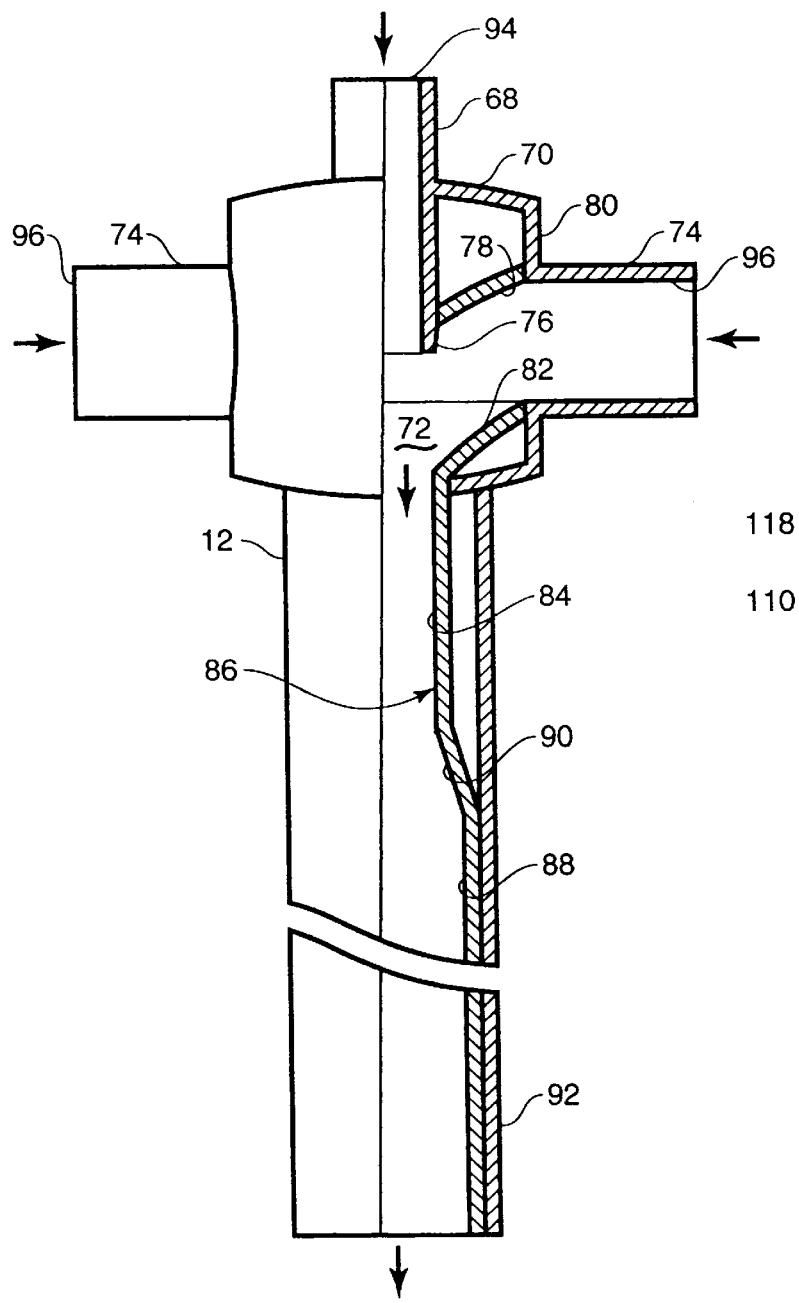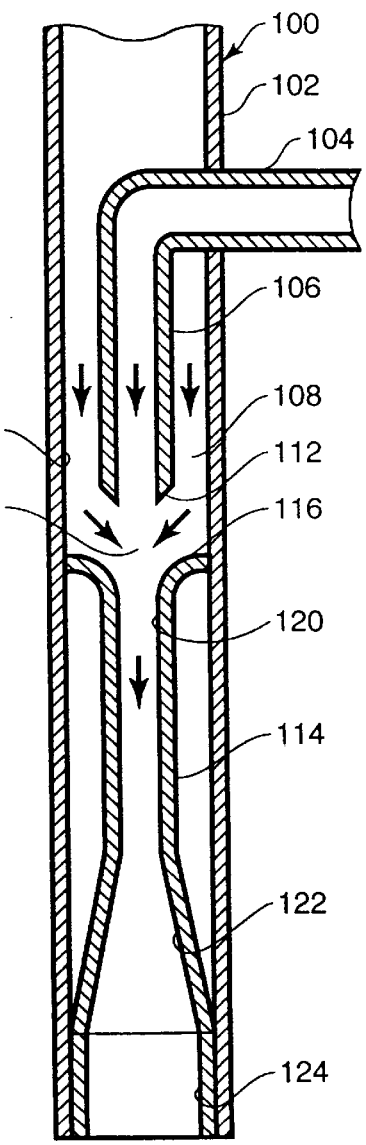
FIG. 2  FIG. 3

POLYPHASIC PRESSURIZED HOMOGENIZER

BACKGROUND OF THE INVENTION

This invention relates to a polyphasic, pressurized homogenizer, which is a dynamic liquid and gas contact system for removing substances from the gas. The substances in the gas may be in solid, gas or vapor form. The liquid and gas contact system primarily functions as dynamic removal and recovery system for extracting a variety of substances from a gas stream for disposal or reuse depending on the nature of the application and the substance recovered.

When used as a pollution control system, the recovered substances are stripped from the gas, typically air, and entrained in the liquid. Depending on the toxicity of the recovered substance and the nature of the liquid used, most typically water, the extracted substance is disposed with the liquid in an ordinary waste water stream. Alternately, the substance removed from the gas may be separated from the liquid for specialized disposal. The liquid stripped from the recovered substance is generally suitable for recycling in the removal and recovery system.

When used as a stage in a material processing circuit, the removed and recovered substances may be concentrated and separated from the liquid for reintroduction into the processing stream.

The invented polyphasic, pressurized homogenizer is related to gas liquid contact systems where a gas stream is brought into intimate contact with a liquid stream to entrain in the liquid a gaseous, droplet or particulate substance carried in the gas stream. Countercurrent contact towers and liquid spray scrubbers are typical of this type of removal and recovery system.

In the invented gas and liquid contact system, a discharge nozzle directs a relatively high velocity stream of liquid into a confluent stream of gas having a substantially concurrent direction of flow as the liquid. The turbulent intermix of gas and liquid is homogenized in a pressurized mix chamber, with additional stripping occurring under the abrupt reduced pressure of a connected venturi. The accelerated combined flow from the venturi is expanded into a retention chamber to prolong the intimate contact and homogenization before ejection into a recovery chamber having a liquid reservoir.

Preferably, the retention chamber comprises a conduit segment in alignment with the venturi, and the recovery chamber comprises a tank with a reserve quantity of liquid. The liquid may comprise a solvent, specifically selected for removal of a particular substance in the gas stream, or a common liquid, such as water, that simply provides a carrier stream for particulate substances removed from the gas stream. It is to be understood that the gas stream initially carries the substance or substances to be removed, and may comprise a multiple gas mixture, a gas and droplet mixture, including vapors, or a gas and particulate mixture.

As noted, the polyphasic pressurized homogenizer of this invention is adapted for use in the home, commercial establishment or industry. For example, in home use, the system may comprise an air purifier to remove dust, smoke and airborne gases such as radon from the household air for disposal. The system is preferably used in conjunction with a blower system with or without pre-filtration of the gas stream. In a commercial establishment, the system can also be used as an air purifier, particularly in isolated environments such as paint spray rooms where rapid removal of airborne droplets and gaseous solvents is desired. In an industrial setting the system can be used to recover substances in a processing stage, for example, to recover comminution products that are airborne.

These and other uses of the invented system will become apparent on consideration of the features of the invention that provide for dynamic homogenization of a gas stream and a liquid stream, where substances are to be removed from the gas stream and entrained in the liquid stream.

SUMMARY OF THE INVENTION

The polyphasic, pressurized homogenizer of this invention is a system that dynamically mixes a liquid stream and a gas stream under pressure and expands the mixed streams in a venturi and retention chamber where the homogenized streams provide intimate contact of the substances contained in the gas stream and the liquid forming the liquid or solvent stream.

The system allows an instant and turbulent contact of the gas stream and liquid stream in a pressurized mixing chamber where a confluent gas stream collides with a nozzle discharge of a liquid stream. The breakup of the liquid and the mixture of the liquid and gas stream is further enhanced during acceleration and passage through a venturi to an expansion conduit before discharge into a liquid reservoir.

The homogenizer system includes a homogenizer unit with a liquid conduit having a discharge nozzle within a mixing chamber that forms a manifold for confluent gas streams that coverage at the discharge nozzle. The manifold for the confluent gas streams is configured to redirect convergent gas flow from a direction transverse the liquid flow to one substantially along the liquid flow. The resulting explosive breakup of the liquid stream into a turbulent mixture of liquid droplets and dispersed gas increases the surface area contact of the liquid, the gas and the target substances carried in the gas. Droplet fragmentation is enhanced during acceleration and expansion in the retention conduit, and during ejection from the retention conduit into a reservoir for the carrier liquid.

In a homogenizer system, a number of homogenizer units may be staged with a series of liquid reservoir tanks for incremental improvements in the scrubbing of the carrier gas.

Accompanying the homogenizer unit in a typical contact system is a pump or other source for pressurizing the liquid that is discharged from the discharge nozzle. In a household environment, the household water supply provides an adequate pressure for most situations and a pump is not required unless water is recycled. Similarly, in the preferred embodiment, the gas stream is pressurized to provide a volumetric ratio of 3–5 units of the gas stream to a unit of the liquid stream. While the discharge of the liquid at the nozzle of a conduit for the liquid stream will cause a vacuum draw of air as in the manifold of the mixing chamber, the gas stream is preferably pressurized. Pressurization of the gas stream by a blower or other regulated pressurization means provides the desired flow rate to the gas stream and pressurizes the manifold mixing chamber for acceleration of the homogenized mixture in the venturi and expansion in the conduit guide of the retention chamber. Pressurized gas from a pressurized source, for example, a pneumatic conveying conduit in a raw materials treatment process may similarly be used for achieving the desired flow ratio of the liquid stream and the gas stream.

The polyphasic pressurized homogenizer unit is fabricated in a range of scaled sizes for accommodating a range of uses from a household air purifier to an industrial scrubber.

BRIEF DESCRIPTION OF THE DRAWINGS

FIG. 2 is a side elevational view, partially in cross section, of the homogenizer unit of FIG. 1.

FIG. 3 is a side elevational, cross-sectional view of an alternate embodiment of the homogenizer unit.

DETAILED DESCRIPTION OF THE PREFERRED EMBODIMENTS

Figure 1:
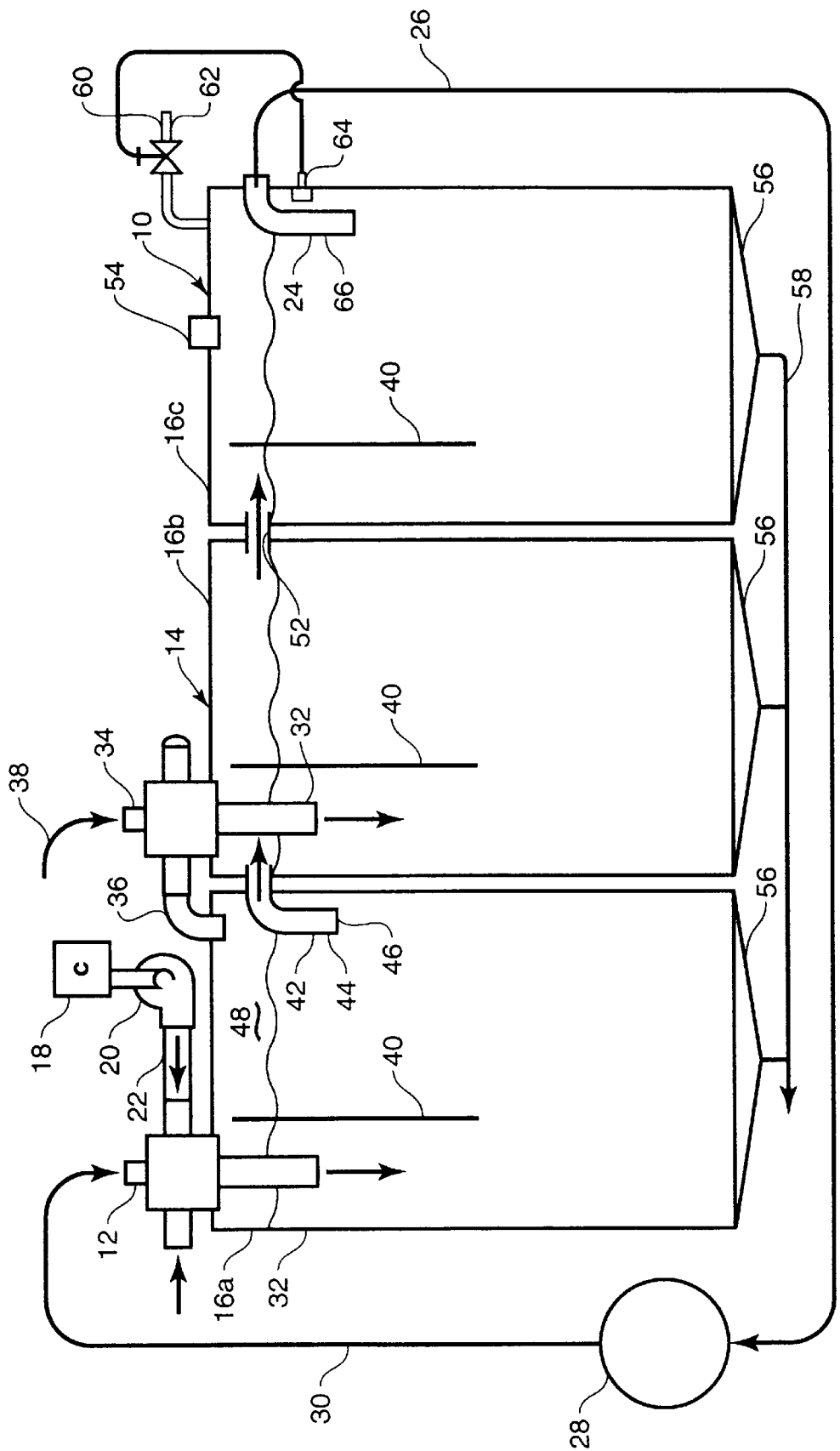
FIG. 1 is a diagrammatic view of the homogenizer unit in a recovery system.

The polyphasic, pressurized homogenizer system of this invention is a dynamic liquid-gas contact process that utilizes a homogenizer unit together with auxiliary components suitable for a particular environment of use.

Referring to FIG. 1, a typical homogenizer system, designated generally by the reference numeral 10 is configured for an industrial recovery process, such as dust removal during comminution grinding. In such an environment, particulate material is removed from an air stream and recovered as a decanted sludge that may be dried and returned to the industrial processing stream. Additionally, the liquid in the exemplar homogenizer system is recovered and recycled. It is to be understood that where the removed substance from the gas stream is not toxic, simple removal and disposal systems for home or commercial use do not require the recovery components. The contaminated liquid, usually water, is simply flushed to the waste water or sewer system.

In the homogenizer system of FIG. 1, a homogenizer unit 12 is operated with a recovery unit 14 comprising a series of settling tanks 16a–16c. The homogenizer unit 12 in the exemplar system 10 of FIG. 1 eliminates fine particulate dust form an enclosed environment, such as a milling room, schematically represented by box 18. During a comminution process, where extremely fine particle matter is created, airborne particulate matter must be continually removed. While filtration is effective for larger particles, removal of smaller particulate matter by filtration is difficult because of filter clogging. Thus, even a conventional bag house passes fine material, particularly during the cleaning cycle, and will benefit from environmental air decontamination.

In FIG. 1, air with suspended contaminants is drawn from the environment 18 by a blower 20 connected to the homogenizer unit 12 by a conduit 22. Simultaneously, water is drawn from the final settling tank 16c through an intake 24 and feed conduit 26 by a pump 28 which is connected to the homogenizer unit 12 by delivery conduit 30. The contaminated air and water are thoroughly mixed in the homogenizer unit 12 and ejected through a segment of conduit 32, which functions as a retention chamber to prolong the intimate contact of the aqueous mixture before discharge into the first settling tank 16a.

Ordinarily, a single homogenizer unit 12 is employed in a system. Alternately, a plurality of units may be incorporated, and the system 10 of FIG. 1 shows a second unit 34 mounted on the intermediate settling tank 16b. In such arrangement, air from a pressurized first tank 16a is supplied through a relief passage 36 to mix with water from a branch 38 of the water delivery conduit 30 for discharge of the homogenized mixture into the intermediate settling tank 16b. To compensate for the double pressure drop, the blower 20 operates at a higher pressure than for a single unit system. Alternately, the first tank can operate at atmospheric pressure with a separate blower drawing air form the first tank 16a and delivering it to the homogenizer unit 34 of the intermediate tank 16b. In a similar manner, a third homogenizer unit (not shown) can be incorporated on the third tank 16c in series with the two units shown in FIG. 1.

To improve the settling of the air contaminant, each tank is equipped with a baffle 40 to separate the turbulent inflow from the outflow. In the pressurized first tank 16a, the water level is maintained by an overflow 42 having an elbow 44 with an intake 46 below the water level to maintain the desired pressure in the air space above the liquid level 50. Since the intermediate tank 16b and final tank 16c are not pressurized, an overflow passage 52 directly connects the two tanks for passage of air and water from the second tank 16b to the third tank 16c. A vent 54 provides a relief passage for decontaminated air from the third tank 16c.

During each stage, particulate matter settles to a conical bottom 56 of each tank. Periodically, the decanted sludge is drawn from the tank through a recovery line 58, where the material is sent for disposal or drying and reprocessing. Makeup water may be supplied to the tank system from a source 60 to maintain the water level through a control valve 62 regulated by a level control 64. Recycled water is drawn from the submerged intake 24 of discharge elbow 66 by the pump 28 for supplying the homogenizer units 12 and 34.

The typical construction of the homogenizer units 12 and 34 is shown in the partial cross sectional view of the exemplar homogenizer unit 12 in FIG. 2. Referring to FIG. 2, the homogenizer unit 12 is constructed with a liquid supply conduit 68 mounted to the cylindrical housing 70 of a mixing chamber 72. Also, mounted to the housing 70 are a pair of opposed gas supply conduits 74, which are positioned on a common axis transverse to the axis of the liquid supply conduit. Internally, the liquid supply conduit 68 terminates in a chamfered discharge nozzle 76 to discharge a liquid stream into the mixing chamber 72 where a convergent flow of gas from the opposed gas supply conduits meets.

To improve flow rates, the housing 70 has an internal structure with an annular deflector plate 78 spanning the internal wall 80 of the housing 70 and connects to the outside circumference of the discharge nozzle 76 to deflect the transverse flow of the gas to a convergent flow along the discharge of the nozzle. A similar, annular guide plate 82 spans the internal wall 80 of the housing 70 and connects to the constricted segment 84 of an internal venturi 86. In addition to redirecting the colliding flow of gas, the deflector plate 78 and guide plate 82 provide structural support for the discharge nozzle 76 and the venturi 86.

The constricted segment 84 of the venturi merges into an expanded segment 88 by an interconnecting transition segment 90. The venturi 86 is contained within a discharge conduit 92 that is mounted to the housing 70 at one end and has a minimum length equal to the venturi as shown. The discharge conduit 92 may be extended where it is desired to extend the duration of the intimate contact of the homogenized liquid and gas.

In operation, pressurized liquid, generally water or an aqueous solution that includes a surfactant, solvent, neutralizing agent, or other enhancement substance, is pumped to the intake port 94 of the liquid supply conduit 68. Similarly, pressurized gas, such as contaminated air, is blown into the opposed gas supply ports 96 of the gas supply conduits 74 of the homogenizer unit. The convergent gas flow collides with the expanding liquid flow discharged from the nozzle 76. The liquid gas mixture accelerates through the constricted segment 84 of the venturi 86 and expands in the expanded segment 88 where intimate contact of the brokenup liquid flow and gas flow continues until discharge into a collector vessel such as the tank 16a of FIG. 1.

It is to be understood that the dynamics of the convergent and colliding flow of gas and liquid can be achieved by alternate constructions of the homogenizer unit as shown in FIG. 3.

As shown in the cross-sectional view of FIG. 3, the homogenizer unit 100 is constructed with an outer conduit 102 providing the supply conduit for a gas flow that is interrupted by a side entry liquid conduit 104 that has a discharge segment 106 centered in the outer conduit. The gas flows concentrically around the liquid conduit in an annular passage 108 that converges in a mixing chamber 110 at the nozzle end 112 of the discharge segment 106 of the liquid conduit 104. The enlarged mixing chamber 110 connects to a venturi 114 through a conical transition section 116 of the venturi which mounts to the inside wall 118 of the outer gas conduit 102 and supports the venturi 114. The venturi 114 has a constricted segment 120 that accelerates the turbulent mixture of gas and liquid to an expansion segment 122 that provides a transition to a retention segment 124 at the end of the unit.

The nozzle end 112 of the discharge segment 106 is chamfered to assist in the convergence of the gas stream in collision with the liquid discharge. The alternate construction of the homogenizer unit is less expensive to fabricate, but may be subject to greater wear, particularly where abrasive particulate matter is carried by the gas stream.

It is to be understood that the units disclosed are scalable for use in systems of different capacity. In general, the gas flow by volume is preferably 3–5 times the liquid flow. Conduit sizes and pressurization of the gas and liquid must be adjusted accordingly to achieve this ratio. Generally, liquid pressure ranges from 30 p.s.i. to 80 p.s.i. for most applications.

It is to be further understood that the liquid stream and the gas stream can be treated prior to mixing to improve extraction. For example, where the gas stream includes the contaminant hydrogen sulfide, the solubility of the noxious gas in a water stream can be enhanced by the addition of an amine, such as monoethanolamine to the water stream. Additionally, alcohols on the other hand are very soluble in a moderately basic solution while benzene, toluene, etc. are very soluble in water solutions with a neutral surfactant. The gas stream can also be treated prior to mixing with the liquid stream. For example, the gas shown can be treated thermally, or with ultraviolet light or ozone for chemical change or to destroy organisms, or with other gases to alter chemical compositions, such as treating hydrogen sulfide with sulfur dioxide to generate easily recoverable elemental sulfur.

Similarly, the reservoir liquid can be treated with an acid to neutralize caustic substances entrained in the gas stream or with a base to neutralize acid substances. And, adding surfactant to the water stream or reservoir water can aid in forming emulsions for water insoluble vapors. Similarly, a surface oil such as mineral oil on the reservoir water can trap and absorb water insoluble vapors that can be recovered by distilling the oil.

These and other applications of the polyphasic pressurized homogenizer can be implemented where a particular contaminant or recovery product is desired to be removed from a gas stream.

What is claimed is:

1. A homogenizer unit for removing substances from a gas stream by mixing with a liquid stream comprising:

gas intake means for receiving a flow of a gas having a substance to be removed;

liquid intake means for receiving a flow of a liquid with an affinity for the substance to be removed wherein the liquid intake means comprises a liquid conduit having a straight segment of uniform cross section with an end opening comprising a liquid discharge nozzle for ejecting a nozzle stream of a liquid;

a housing forming a mixing chamber, wherein the gas intake means comprises two gas conduits having opposed gas discharge ports in the housing forming the mixing chamber, the gas conduits having a common axis with the discharge ports directed at the end opening of the straight segment of the liquid conduit, and a gas deflector means connected to said gas discharge ports and to said end opening of said straight segment of the liquid conduit for directing gas flow in a confluent stream directly into the nozzle stream of the liquid ejected from the discharge nozzle, wherein the liquid conduit has an axis and the gas conduits have a common axis transverse to the axis of the liquid conduit; and a conduit means connected to the mixing chamber housing opposite the liquid conduit having a venturi passage in communication with the mixing chamber and having a discharge means for discharging a gas and liquid mixture into a receiver means for separating the gas from the liquid.

2. The homogenizer unit of claim 1 wherein the gas conduits have intake ports connectable to a pressurized gas supply.

3. The homogenizer unit of claim 1 wherein the liquid conduit has an intake port connectable to a pressurized liquid supply.

4. The homogenizer unit of claim 1 in combination with a receiver means for separating the gas from a liquid having the substance to be removed.

5. The homogenizer unit of claim 4 wherein the receiver means comprises a liquid reservoir.

6. The homogenizer unit of claim 5 wherein the liquid reservoir comprises at least one tank.

7. The homogenizer unit of claim 1 in combination with a pressurized liquid source connected to the liquid intake means.

8. The homogenizer unit of claim 7 wherein the pressurized liquid source comprises a liquid reservoir and a pump having an intake means connected to the liquid reservoir and a discharge connected to the liquid intake means of the homogenizer unit.

9. The homogenizer unit of claim 8 wherein the pump discharge is connected to the liquid intake with a liquid conduit.

10. The homogenizer unit of claim 1 in combination with a pressurized gas source connected to the gas intake means.

11. The homogenizer unit of claim 10 wherein the pressurized gas source comprises a gas environment and a blower having an intake connected to the gas environment and a discharge connected to the gas intake means of the homogenizer unit.

12. The homogenizer unit of claim 11 wherein the blower discharge is connected to the gas intake with a gas conduit.

13. The homogenizer unit of claim 1 wherein the opposed gas discharge ports are directed at the middle of the mixing chamber.

* * * * *